United States Patent [19]

Piana et al.

[11] Patent Number: 4,603,924

[45] Date of Patent: Aug. 5, 1986

[54] MULTIPLE STRIP SUPPORT FOR WIRE MARKING ELEMENTS TO BE APPLIED ON CABLES AND TERMINALS

[75] Inventors: Ivana Piana; Silvano Piana, both of Genoa, Italy

[73] Assignee: Grafoplast S.p.A., Italy

[21] Appl. No.: 614,820

[22] Filed: May 29, 1984

[30] Foreign Application Priority Data

Jul. 23, 1983 [IT] Italy ............................ 12587 A/83

[51] Int. Cl.$^4$ ..................... A47B 97/02; G09F 3/00
[52] U.S. Cl. .................................. 312/183; 40/316; 40/490; 40/530
[58] Field of Search ............. 40/316, 489, 490, 530, 40/618; 312/297, 187, 193, 183

[56] References Cited

U.S. PATENT DOCUMENTS 236,610  1/1981  Moon ................................. 40/530

FOREIGN PATENT DOCUMENTS 89009  12/1921  Austria .............................. 40/490
664182  6/1963  Canada ............................. 40/490
2239182  3/1975  France .............................. 40/316

Primary Examiner—William E. Lyddane
Assistant Examiner—Gerald A. Anderson
Attorney, Agent, or Firm—Jacobs & Jacobs

[57] ABSTRACT

A support for multiple strips, comprising a casing having identical upper and lower faces with transverse grooves and an alignment hole therein, lugs are provided on at least one side of the casing, the lugs forming female hinge parts, and walls are provided for covering each face of the casing, the walls each having a plurality of transverse webs forming a plurality of slits therebetween, the webs having a T-section along part of their length and a square section along another part of their length, the webs extending into the grooves, the walls having a pin arranged to enter the alignment hole to obtain registry of the wall with its associated casing, the female hinge parts of one casing being operable to cooperate with the female hinge parts of another casing to hingedly connect one casing to another casing.

6 Claims, 18 Drawing Figures

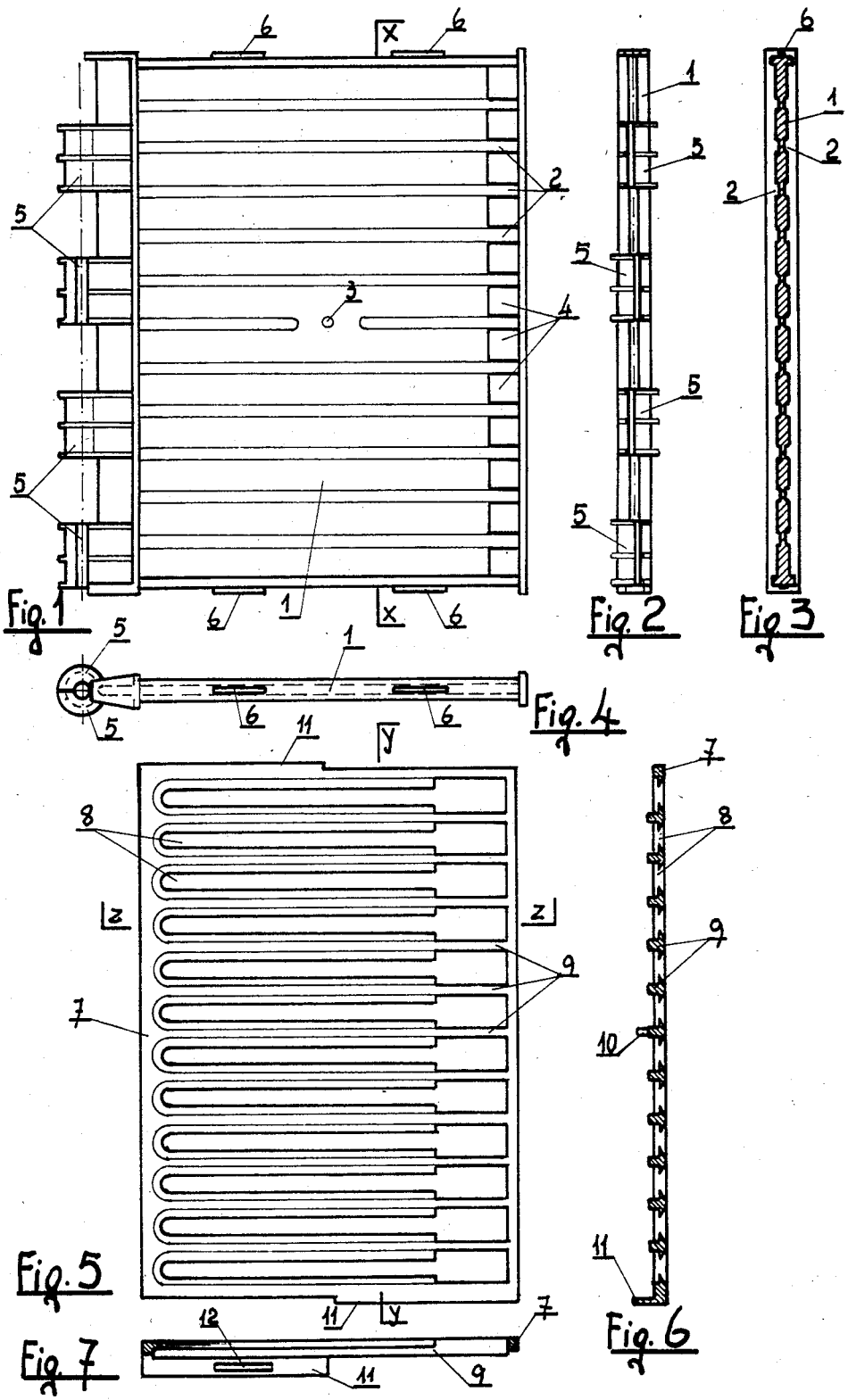

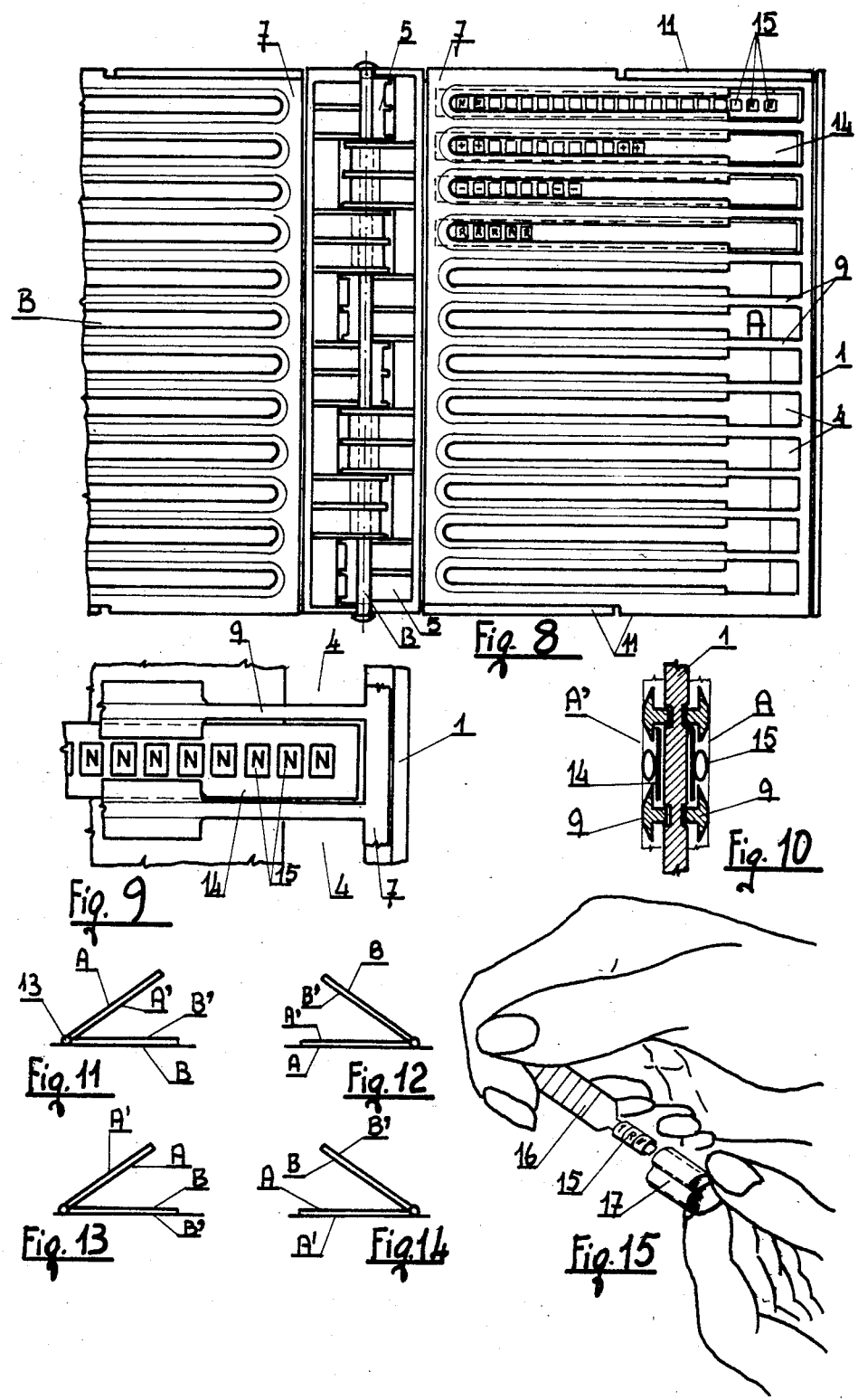

MULTIPLE STRIP SUPPORT FOR WIRE MARKING ELEMENTS TO BE APPLIED ON CABLES AND TERMINALS

This invention relates to a multiple strip support such as for strips bearing marking elements for the identification of cables and terminals.

At present, cables and terminals are identified by marking elements (small rings) which are mostly glued onto cardboard, plastic or other suitable strips; each strip bears a given alpha-numerical character or other sign. The marking elements are removed from these strips with a tab to compose the required marking code which is then introduced into a recess in a suitably shaped support or sleeve to be mounted on the cables or terminals.

These types of strips are now arranged in a container with various compartments, but these supports are now laid flat on one side only of the strips. This means that the container can only accommodate a limited number of strips and that numerous supports must be available for normal wire marking work; these supports must be kept separated but used promiscuously entailing a considerable loss of time for the operator.

Recently a new problem cropped up regarding the arrangement of the strips.

Formerly, the marking elements were positioned with their transverse axis on the strips so that the strips could be lodged easily by inclination in the support to remove the elements. Today the elements are mostly positioned with their axis parallel to the strip to facilitate glueing of the small ring, obtained by extrusion and therefore already in the correct position without the need for 90° rotation. The known types of support are however unsuitable for this new production method.

This invention has the aim to create a multiple strip support, i.e. capable of containing a large number of strips but with limited dimensional requirements and low production cost, the marking elements being positioned with their axes parallel to the strip while the support is designed for optimum arrangement, handling and removal of the marking elements.

Substantially, according to this invention, this multiple strip support consists of a body or casing sidewise fitted with one or two hinges, having the same shaped upper and lower face and provided with an upper and lower covering wall fitted into the body or casing and featuring numerous slots delimited by partially T-shaped webs so that an interchangeable strip bearing the marking elements can be easily introduced between each adjacent pair of webs. The hinge(s) permit assembly of several such casings so as to obtain a multiple support which can be set up in a slanting position for easy removal of the marking elements or replacement of the emptied strips by new ones.

Embodiments of the present invention are illustrated for exemplification purposes in the accompanying drawings, in which:

FIG. 1 shows a front view of one face of the supporting casing together with one lateral hinge;

FIG. 2 shows a left side view of the casing of FIG. 1;

FIG. 3 shows a cross section of the casing according to the X—X axis of FIG. 1;

FIG. 4 shows a top view of the casing according to FIG. 1;

FIG. 5 shows an external front view of one covering wall of the casing;

FIG. 6 shows the Y—Y cross section of the wall illustrated in FIG. 5;

FIG. 7 shows the horizontal section according to Z—Z of FIG. 5;

FIG. 8 shows two assembled casings and their walls in an exemplified multiple container;

FIG. 9 shows the frontal view of an enlarged detail of the container in which a strip, complete with marking elements, is introduced and removed;

FIG. 10 shows the cross section of the detail illustrated in FIG. 9;

Figure 16:
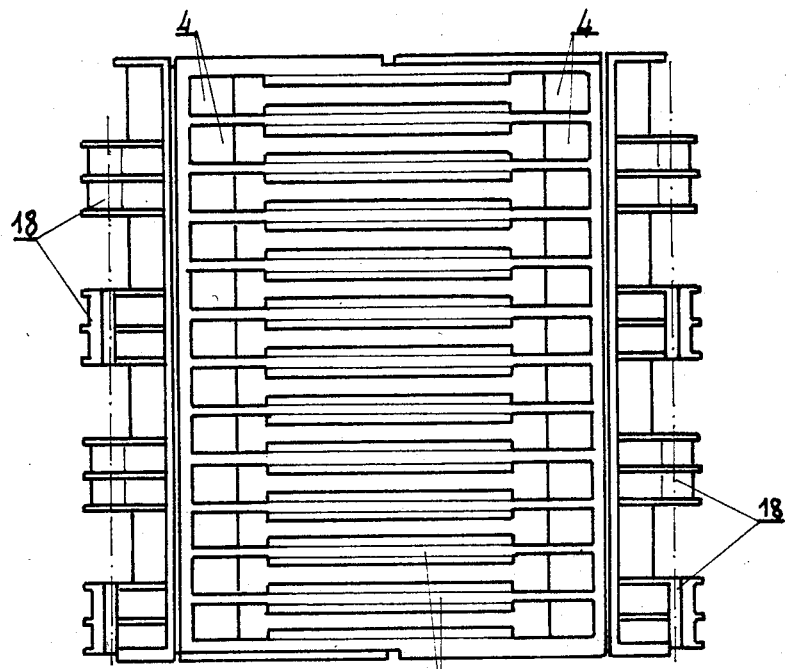
Figure 17:
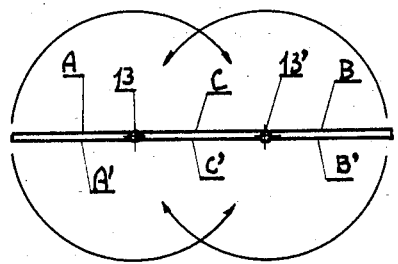
Figure 18:
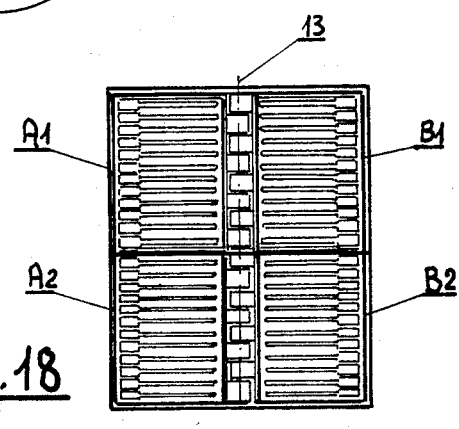

The FIGS. 11, 12, 13 and 14 schematically show the various arrangements of a two-casing container on the work table;

FIG. 15 shows how the marking elements are introduced in an exemplified support;

FIG. 16 shows the frontal view of one casing face, hinged on both sides;

FIG. 17 schematically illustrates the various rotating positions of a multiple container of three sidewise assembled casings; and FIG. 18 schematically illustrates a multiple container consisting of superposed casing pairs.

With reference to the FIGS. 1 through 15, the casing 1 of the support features on both faces equal transverse grooves 2, one or more holes 3 and slots 4 on one side; these slots are usually square shaped and are located between the grooves 2; the other side of the casing features lugs 5 acting as a female hinge of any configuration though preferably in alternatively opposed semicircles. Rectangular bosses 6 are located on the upper and lower side of the casing 1 which is covered on both faces by walls 7 each of which has numerous transverse recesses 8 delimited by separating webs 9 having a T-configuration for most of their length, while ending with a rectangular section coinciding with the slot 4 in the casing 1. These partitions 9 are extending downwards, penetrating the guide grooves 2 of the casing. Pin teeth 10 will engage in the holes 3 of the casing 1 to ensure perfect fitting of the walls 7 on the casing 1. The upper and lower sides of the wall 7 have staggered lugs with recesses 12 in which to fit two staggered bosses of the casing during assembly of the wall, whereas the other wall is blocked by its own lugs 11 on the other two bosses 6 of the casing. From the foregoing, it can be observed that two casings A and B, protected on both sides by the walls 7, can be assembled by a pin 13 illustrated in FIG. 8 and receive the strips 14 bearing the marking elements 15.

As already illustrated in detail in FIGS. 8, 9 and 10, the length of the strips 14 is such as to enter the slits 8, while resting on the casing 1 and the strips are kept in place by the flanges of the T-shaped webs. The unflanged portion of these webs 9 permits to introduce new strips after removal of the depleted strips. Removal of these empty strips is facilitated by the slots 4 through which the empty strip is pushed outwards by pressing against the corresponding strip mounted on the other face of the support.

The hinged configuration 5 as illustrated, makes it possible to assemble two identical but respectively inverted casings on one pin 13 while ensuring that any of the faces A, A' of the first casing or B, B' of the second casing is turned upwards when slanted with respect to the horizontal, while the other, not visible casing is acting as a support as illustrated in the FIGS. 11, 12, 13 and 14. This slanting position is useful, even for left-handed people, to remove the marking elements 15 with the aid of a proper tool 16. When the code has been prepared on this tool, it is usually introduced in the transparent recess of a sleeve 17 as indicated in FIG. 15.

FIG. 16 illustrates a variation of the above described support, in which the casing 1 features hinged lugs 18 on both sides to be connected to two or more lateral casings. In such case, the walls 7 have the partitions 19, their T configuration being limited to the central portion, whereas the casing has slots on both sides between the grooves 2 in which to introduce the strips so that the latter can be inserted and taken out from either side. FIG. 17 shows a schematic outline of a multiple support consisting of 3 casings, A, B and C, the faces of which A, A', B, B', C, C' can be turned as desired towards the operator by rotating the casings properly around the hinge-pins 13 and 13' in the direction of the arrows.

FIG. 18 shows a multiple support consisting of several pairs of casings A1, B1, A2, B2 placed adjacent each other and hinged upon one single central pin 13.

This multiple support can therefore be used to hold a large quantity of strips bearing different marking elements, while ensuring not only simple and practicle use, but also low manufacturing costs only requiring one mold for the casing and another mold for the covering wall.

We claim:

1. A support for multiple strips, comprising a casing having identical upper and lower faces with transverse grooves and hole means therein, lug means on at least one side of said casing and forming female hinge parts, and wall means covering each face of said casing, said wall means each having a plurality of transverse webs forming a plurality of slits therebetween, said webs having a T-section along part of their length and a square section along another part of their length, said webs extending into said grooves, said wall means having pin means arranged to enter said hole means to obtain registry of said wall means with its associated casing, said female hinge parts of one casing being operable to cooperate with said female hinge parts of another said casing to hingedly connect one said casing to another said casing.

2. A support according to claim 1, wherein each said casing has lugs on its upper and lower ends and each said wall means has staggered bosses with complementary recesses, whereby said wall means may be assembled by engagement of said lugs and bosses.

3. A support according to claim 1, wherein said casing has slot means at one side thereof and between said grooves to facilitate removal of said strips.

4. A support according to claim 1, wherein at least one said casing has said female hinge parts on both sides thereof, whereby a plurality of said casings can be assembled in horizontal sequence.

5. A support according to claim 1, wherein said cooperating hinge parts are operable to dispose a desired face of one casing at a slant while a said casing hingedly connected thereto is horizontally disposed.

6. A support according to claim 5, wherein said lug means forming said female hinge parts are alternately opposed semi-circular lug means.

* * * * *